3,001,982
AZO DYESTUFFS

Hans Krzikalla, Heidelberg, and Guenter Lange and Bernd Eistert, Ludwigshafen (Rhine), Germany, assignors to Badische Anilin- & Soda-Fabrik Aktiengesellschaft, Ludwigshafen (Rhine), Germany
No Drawing. Filed Aug. 8, 1955, Ser. No. 527,131
Claims priority, application Germany Aug. 11, 1954
5 Claims. (Cl. 260—151)

This invention relates to new azo dyestuffs and to a method of manufacturing these dyestuffs.

Among the principal objects of this invention are provisions for new azo dyestuffs containing a radical of a 2.3-hydroxy-naphthoic acid hydroxy alkyl amide.

Another object is to provide new azo dyestuffs containing a radical of a 2.3-hydroxy-naphthoic acid hydroxy alkyl amide and having in ortho position to the azo group a hydroxy, alkoxy or carboxylic acid group.

A further object of the invention is to provide new azo dyestuffs which are valuable pigments having, in particular, a good oil fastness.

A further object is to provide complex dyestuffs of a metal salt and an azo dyestuff containing a 2.3-hydroxy-naphthoic acid hydroxy alkyl amide and having in ortho position to the azo group a hydroxy, alkoxy or carboxylic acid group.

These objects and other objects and advantages which will be apparent from the more detailed description of the invention, may be accomplished by coupling an aromatic diazo compound with a hydroxy alkyl amide of 2.3-hydroxy-naphthoic acid.

Suitable diazo compounds are derived, for instance, from aniline, toluene, or alpha or beta naphthylamine. Of particular interest are diazo compounds derived from the halogen, nitro and sulfonic acid derivatives of said aromatic amines, such as nitro-anilines, chloro-anilines, dichloro-anilines, nitro - toluenes, and chloro - toluenes. The diazo compound preferably contains in ortho position to the diazo group a hydroxy, a methoxy or carboxylic acid group. Other suitable diazo compounds are the tetra-azotized aromatic diamines, such as benzidine or p.p'-diamino-diphenyl-methane.

With these aromatic diazo compounds there are coupled hydroxy alkyl amides of 2.3-hydroxy-naphthoic acid containing preferably from 2 to 4 carbon atoms in the alkyl radical. Such hydroxy alkyl amides are, for instance, the hydroxy ethyl, 2'-hydroxy propyl, 3'-hydroxy propyl, 2'.3'-dihydroxypropyl and the 4'-hydroxy butyl amide of 2.3-hydroxy-naphthoic acid. These amides may be obtained, for instance, by the interaction of a 2.3-hydroxy-naphthoic acid ester or halogenide with the corresponding hydroxy alkyl amine.

The coupling of the dyestuff intermediates is carried out in the conventional manner, preferably in a slightly alkaline aqueous medium and/or while an acid binding or acid neutralizing agent, such as sodium carbonate or sodium acetate or pyridine, is added.

As far as they do not contain sulfonic acid groups, the new azo dyestuffs are pigments which have a very good oil fastness and which do not bleed out. They may be used, therefore, to color lacquers and varnishes. From azo dyestuffs which contain sulfonic acid groups, pigments with a good fastness against solvents may be prepared by interacting the primary-obtained dyestuffs with barium or calcium salts in the conventional manner.

When the new dyestuffs are prepared from diazo compounds containing in ortho position a hydroxy, alkoxy or carboxylic acid group, they may be converted into complex chromium, cobalt or copper dyestuffs by reacting them with a salt of these metals. The complex azo dyestuffs give fast dyeings on wool or on polyamide fibers.

The following examples are given to further illustrate this invention, but the invention is not restricted to these examples. The parts are by weight.

Example 1

An aqueous diazo solution, which has been prepared by diazotizing 15.2 parts of 2-nitro-4-amino-1-methylbenzene in a conventional manner, is interacted while stirring in an aqueous solution of 24 parts of 2.3-hydroxy-naphthoic acid hydroxy ethyl amide. The amide solution contains such an amount of diluted aqueous sodium hydroxide that the reaction medium shows after the coupling reaction has been completed a slightly alkaline reaction.

A red dyestuff is obtained in a practically quantitative yield having a very good oil and light fastness.

Dyestuffs with similar properties are formed if instead of 2-nitro-4-amino-1-methylbenzene the diazo compounds of the following aromatic amines are coupled with 2.3-hydroxy-naphthoic acid hydroxy methyl amide:

2-nitro-aniline (orange-red)
3-nitro-aniline (orange-red)
4-nitro-aniline (red)
2-chloro-aniline (scarlet)
3-chloro-aniline (scarlet)
2.5-dichloro-aniline (scarlet-red)
4-chloro-2-amino-1-methylbenzene (red)
5-chloro-2-amino-1-methylbenzene (red)
5-nitro-4-amino-1-methylbenzene (red)
3-nitro-4-amino-1-methoxybenzene (red)
5-nitro-2-amino-1-methoxybenzene (blue-red)

The 2.3-hydroxy-naphthoic acid hydroxy ethyl amide is prepared in the following manner:

101 parts of 2.3-hydroxy-naphthoic acid methyl ester and 35 parts of monoethanol amine are heated to a temperature of 130° C. in a stirring vessel fitted with a descending condenser, 16 parts of methanol being distilled off. The bottoms consist of practically pure 2.3-hydroxy-naphthoic acid hydroxyethyl amide which melts at 146° C. after recrystallization from methanol.

If 40 parts of 3-amino-1-hydroxypropane are used instead of 35 parts of monoethanol amine, the 3'-hydroxy-propylamide of 2.3-hydroxy-naphthoic acid having a melting point of 115° C. is obtained. In an analogous manner the dihydroxyethyl amide (melting point 135° C.) is obtained by reacting 2.3-hydroxynaphthoic acid ethyl ester or 2.3-hydroxy-naphthoic acid methyl ester with diethanolamine, the 2'-hydroxypropyl amide (melting point 106° C.) with 2-hydroxy-1-aminopropane and the 4'-hydroxy butyl amide (melting point 90° C.) with 1-amino-4-hydroxybutane.

Example 2

An aqueous diazo solution obtained by diazotizing 18.6 parts of 3 - amino-6-chloro-1-methylbenzene-4-sulfonic acid in conventional manner is coupled, as described in Example 1, with 2.3-hydroxy-naphthoic acid hydroxy ethyl amide.

To convert the dyestuff into its barium lake 20 parts of the dyestuff are dissolved in 1000 parts of water, 25 parts of sodium carbonate, 50 parts of aluminum sulfate and 100 parts of finely ground barium sulfate are added and then a solution of 80 parts of barium chloride in 800 parts of water is run in. After stirring for 30 minutes, the color lake precipitated is filtered off by suction and dried at 60°–80° C.

The barium lake obtained is a bright red pigment having an outstanding oil fastness.

Example 3

An aqueous tetrazo solution, obtained by tetrazotizing 4.4'-diamino-3.3'-dimethoxydiphenyl in conventional manner, is coupled with 24 parts of 2.3-hydroxy-naphthoic acid hydroxy ethyl amide as described in Example 1. A blue pigment dyestuff is obtained in a good yield which is completely insoluble in rubber and may be used to dye rubber.

Example 4

An aqueous solution obtained by diazotizing 14 parts of 2-amino-5-nitro-1-hydroxybenzene is coupled with 24 parts of 2.3-hydroxy-naphthoic acid hydroxy ethyl amide dissolved in an aqueous sodium hydroxide solution which also contains an amount of sodium bicarbonate necessary to neutralize the acid of the diazo solution. A red dyestuff is obtained which is converted in a complex chromium containing dyestuff as described in U.S. patent specification 2,230,686.

The complex chromium dyestuff dyes cellulose ester varnishes or fibrous materials from polyamides or polyurethanes in a reddish blue shade with a very good fastness. The corresponding cobalt complexes which are prepared in an analogous manner yield somewhat more reddish shades having a similar fastness.

Example 5

A diazo solution obtained by diazotizing 14.2 parts of 2-amino-4-chloro-1-hydroxybenzene is coupled as described in Example 4, with 2.3-hydroxy-naphthoic acid hydroxy ethyl amide. The obtained azo dyestuff is converted into a complex cobalt dyestuff. This yellowish-red complex dyestuff dyes polyamide fabrics in bright red shades having a good light fastness. The dyestuff is also suitable for coloring cellulose ester varnishes. The corresponding complex chromium compound gives somewhat bluer shades having a similar good fastness.

Example 6

14.2 parts of 4-nitro-2-amino-1-hydroxybenzene are diazotized in conventional manner and coupled with 25 parts of 2.3-hydroxy-naphthoic acid 2'-hydroxypropyl amide. The complex chromium compound of the dyestuff thus obtained dyes fibers of polyamides and polyurethanes and nitrocellulose lacquers clear scarlet-red shades.

Example 7

20.3 parts of 2-amino-4-chloro-1-hydroxybenzene-6-sulfonic acid are diazotized and coupled in slight alkaline medium with 24 parts of 2.3-hydroxy-naphthoic acid hydroxy ethyl amide. A red dyestuff is salted out in practically quantitative yield. The dyestuff may be used to dye wool according to the one bath method or the after chromation method in very even marine blue shades having a good light and wash fastness.

If 25 parts of 2.3-hydroxy-naphthoic acid 3'-hydroxypropylamide are used instead of 24 parts of 2.3-hydroxynaphthoic acid hydroxyethyl amide, a dyestuff having almost the same color shade and similar fastness properties is obtained.

Example 8

21.7 parts of 2-aminobenzene-1-carboxylic acid-5-sulfonic acid are diazotized and coupled as in Example 7 with 24 parts of 2.3-hydroxy-naphthoic acid hydroxy ethyl amide. A dyestuff is obtained which dyes wool red with the one bath method or the after chromation method. The obtained dyeings are very fast.

The new azo dyestuffs obtained according to this invention contain at least once the radical

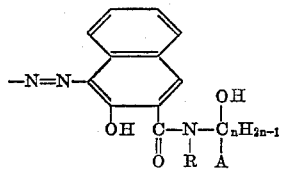

The free valency of this radical is linked to an aromatic radical, A is a hydrogen or a hydroxy radical, R is a hydrogen radical or a radical of the formula $$-C_nH_{2n-1}AOH$$

and $n$ is an integer including 2, 3 and 4.

The following general formula represents the preferred new monoazo dyestuffs of this invention:

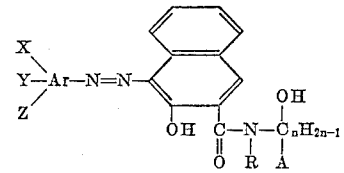

In this formula, Ar is an aromatic, preferably a benzene or naphthalene radical, X is a hydrogen atom, a hydroxy, alkoxy, preferably methoxy, or a carboxylic acid group located in ortho position to the azo group, Y and Z are hydrogen or halogen atoms or alkyl, preferably lower alkyl, nitro or sulfonic acid groups, A is a hydrogen atom or a hydroxy group, R is a hydrogen atom or a $-C_nH_{2n-1}AOH$ radical, and $n$ is an integer including 2, 3 and 4. The term "sulfonic acid" as used to describe this invention includes the free sulfonic acids and their salts in particular their alkali, alkaline earth or ammonium and alkyl ammonium salts.

The invention is hereby claimed as follows:

1. A member selected from the group consisting of an azo dyestuff of the general formula:

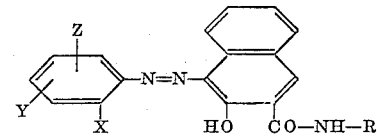

wherein X represents a member from the group consisting of carboxy, methoxy and hydroxy, Y represents a sulfonic acid group, Z represents a member from the group consisting of hydrogen, chlorine, lower alkyl, lower alkoxy, and nitro- groups, and R is a hydroxy lower alkyl group; and its copper, chromium, and cobalt complexes.

2. A member selected from the group consisting of an azo dyestuff of the formula:

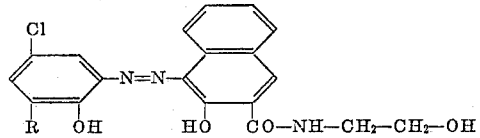

wherein R is a sulfonic acid group, and its copper, chromium and cobalt complexes.

3. A member selected from the group consisting of an azo dyestuff of the general formula:

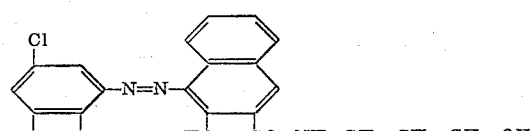

wherein R is a sulfonic acid group, and its copper, chromium and cobalt complexes.

4. A member selected from the group consisting of an azo dyestuff of the general formula:

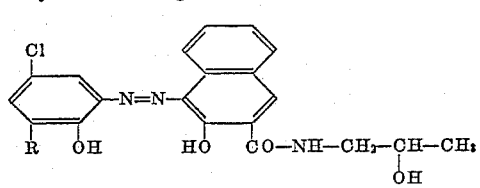

wherein R is a sulfonic acid group, and its copper, chromium and cobalt complexes.

5. A member selected from the group consisting of an azo dyestuff of the formula:
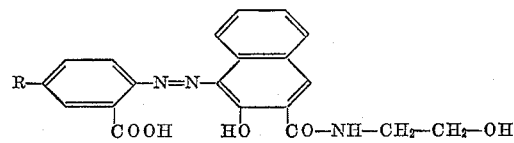
wherein R is a sulfonic acid group, and its copper, chromium, and cobalt complexes.
References Cited in the file of this patent
UNITED STATES PATENTS
2,112,403   Krzikalla et al. _____ Mar. 29, 1938